United States Patent Office 3,592,770
Patented July 13, 1971

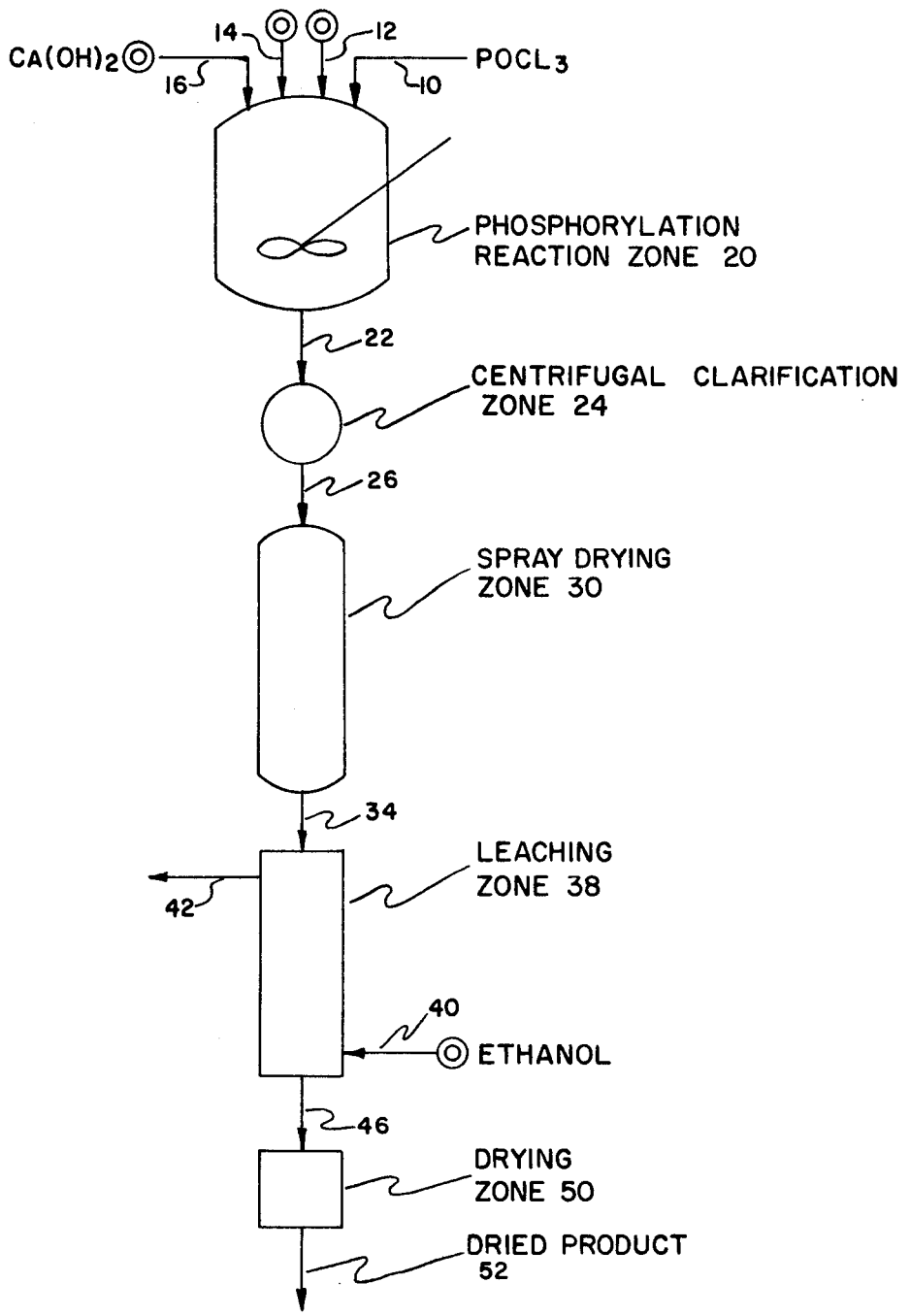

3,592,770
PROCESS FOR RECOVERING COMPOSITIONS CONTAINING CALCIUM SUGAR PHOSPHATES AND INORGANIC PHOSPHATE
John Lambiris, New York, N.Y., assignor to The Colonial Sugar Refining Limited, Sydney, New South Wales, Australia
Filed June 8, 1967, Ser. No. 644,663
Int. Cl. B01j 9/02; C05f 5/00; F26b 3/06
U.S. Cl. 252—1                                                      6 Claims

ABSTRACT OF THE DISCLOSURE

A process for recovering compositions of matter containing calcium sucrose phosphates and inorganic phosphate which comprises phosphorylating sucrose in the presence of lime to obtain a reaction effluent containing calcium sucrose phosphate, inorganic phosphates, calcium chloride, and sucrose, spray drying the reaction effluent to obtaining a porous, finely divided, free-flowing material contain about 10% moisture, and leaching the spray-dried product with 80% ethanol to obtain a product having a chloride content less than about 0.5% and a ratio of organic phosphorus to inorganic phosphorus of about 2:1.

---

This invention relates to a process for recovering compositions containing calcium sugar phosphates, and more particularly, it relates to the novel process for the recovery of compositions containing calcium sugar phosphates and inorganic phosphates of very low chloride content. Still, more specifically, the process of the present invention involves a novel combination of unit operations which permits the production and recovery of compositions containing a complex mixture of calcium sucrose phosphates and inorganic phosphate in a novel and efficient manner.

Calcium sucrose phosphates and complex mixtures thereof with inorganic phosphate have been found to be useful in the prevention of dental caries, as plant and animal nutrients, as coatings for breakfast cereals, and are believed to have wide applications in a variety of other fields. It is known from German Pat. 247,809 that a calcium sucrose phosphate can be produced by the phosphorylation of sucrose in the presence of lime. The resulting calcium chloride must be separated in order to make the final product non-deliquescent and suitable for ordinary handling. The German patent sets forth a method of separating the resulting calcium chloride from calcium sucrose phosphate by precipitation with ethanol followed by repetitive dissolution in water and precipitation by ethanol. Complex mixtures and compositions containing calcium sucrose phosphates and inorganic phosphates are disclosed in co-pending application Ser. No. 414,074, filed on Nov. 27, 1964, now U.S. Pat. No. 3,375,168, granted on Mar. 26, 1968. The method of separating calcium chloride disclosed in co-pending application Ser. No. 414,074 involves the precipitation of the product from the reaction mixture with ethanol followed by washing the product successively with an aqueous ethanol solution. While separation of calcium chloride by ethanol precipitation and/or washing produces a highly satisfactory product, it is, unfortunately, inefficient and economically impracticable on a commercial scale. It is, therefore, the principal object of the present invention to overcome and eliminate the deficiencies inherent in known methods for the separation of calcium chloride from mixtures thereof with calcium sugar phosphates and inorganic phosphate.

Another object of the present invention is to provide an economically attractive process for recovering non-deliquescent compositions containing calcium sugar phosphates and inorganic phosphate.

Another object of the present invention is to separate calcium chloride and sucrose from the product of the phosphorylation of sucrose in the presence of calcium oxy compounds such as lime.

A further object of the present invention is to provide a process for the separation of calcium chloride and sucrose from mixtures thereof with a complex mixture of calcium sucrose phosphates and inorganic phosphate in a novel and efficient manner to produce a non-deliquescent product containing less than about 0.5 percent chloride.

Other objects and advantages will become apparent to those skilled in the art from the following description and disclosure.

These and other objects are generally accomplished in accordance with the process of the present invention by providing effluent liquor of a phosphorylation reaction zone, in accordance with known procedures, which liquor contains essentially an aqueous mixture of a calcium sugar phosphate, inorganic phosphate and calcium chloride. Such liquors will usually contain, additionally, unreacted or residual sugar in appreciable percentages. The liquor is dehydrated to produce an admixture of chloride, sugar, sugar phosphate and inorganic phosphate in relatively dry, solid form. Calcium chloride as well as sugar are then leached from the dried mixture by contacting such mixture with a suitable solvent therefor. Leaching is preferably carried out to reduce the chloride content below about 0.5%. Spray drying the effluent liquor to provide a relatively dry, free flowing solid mixture of the phosphates, chloride, and sugar comprises a perferred method of effecting dehydration and ethanol comprises a preferred solvent.

Prior to the present invention it was not known that mixtures of calcium sucrose phosphates and inorganic calcium phosphates could be reduced to a dry, solid state in the presence of appreciable calcium chloride and unreacted sugar without causing irreversible changes which would alter or destroy the known utility of the compositions. Likewise, it was not known that solid calcium chloride would be physically dispersed in the aforementioned phosphates composition in such a way as to permit an efficient separation of the calcium chloride therefrom. The process of the present invention is predicated upon the discovery that the mixture of organic and inorganic phosphates with calcium chloride and unreacted sucrose can successfully be recovered as a dry solid, for example, by spray-drying, and that the calcium chloride and unreacted sucrose can be leached from the dehydrated mixture, for example, with an ethanol solvent. Furthermore, it has been found in the practice of the present invention that the present process is more economical in its operation than the prior process which involved the ethanol precipitation and washing. Substantially less ethanol is required in the present process since the present process obviates the step of separating substantial quantities of water from the ethanol, which must be recycled for economic reasons. Calcium sucrose phosphates exhibit appreciable solubility in the leaching solvent in the presence of calcium chloride. Consequently, reducing the solvent requirement increases the yield of calcium sucrose phosphate. It has been found that an improvement in yield of ten percent, for example, results from employing the process of the present invention as compared with methods in the prior art. Additionally, the spray-dried solids exhibit superior filtration properties as compared with solvent precipitated mixtures. Finally, it has been discovered in the practice of the present invention that the chemical composition of the product produced in accordance with the present invention is comparable to the product recovered by previously known processes.

Reference is now made to the figure of the drawing and a detailed description of the invention.

The figure of the drawing illustrates, diagrammatically, in elevation a preferred embodiment of the process of the present invention which comprises essentially the production of a phosphorylation reaction liquor in zone 20, dehydration of such liquor in spray-drying zone 30 to produce a resulting dried, free flowing solid mixture containing calcium sucrose phosphates, inorganic phosphates, calcium chloride and sucrose removal of calcium chloride from the mixture in leaching zone 38, and recovery of the product composition suitably reduced in moisture content in drying zone 50.

Referring to the drawing, a calcium sucrose phosphate containing material is prepared in phosphorylation reaction zone 20 by the introduction of suitable quantities of sucrose via line 12, water via line 14, and a calcium oxy compound selected from the group consisting of calcium hydroxide, calcium oxide and calcium carbonate in line 16, and thereafter slowly introducing phosphorus oxychloride ($POCl_3$) via line 10 while agitating the reaction mixture in zone 20. The phosphorylation reaction zone is preferably maintained at a temperature between about 0° and about 20° C. by the application of suitable cooling means. The reaction can be carried out in a batch or continuous manner and the phosphorus oxychloride can be introduced either by itself as set forth in the co-pending application of Campbell et al., Ser. No. 613,619, filed Feb. 2, 1967, now U.S. Pat. No. 3,437,652, granted on Apr. 8, 1969, or in a solution of a chlorinated hydrocarbon solvent such as trichloroethylene or chloroform. The ratio of sugar to calcium oxy compound to phosphorus oxychloride, is preferably, stoichiometric. The present process is not limited to the use of stoichiometric properties of reactants. When the reaction in zone 20 has been carried out to the desired degree, a turbid reaction solution is obtained containing calcium sucrose phosphates, inorganic phosphate, calcium chloride and unreacted sucrose in water. The reaction liquor is passed in line 22 to a suitable clarification zone 24. Satisfactory clarification has been obtained using a centrifugal clarifier operated, for example, from 24,000 to 50,000 r.p.m. Clarified reaction liquor is passed via line 26 to spray-drying zone 30 for dehydration in accordance with the process of the present invention.

Clarified liquor is pumped to either a centrifugal or pneumatic atomizer which discharges into a suitable drying chamber where the droplets are contacted preferably with heated air. The air can be heated directly by combustion gases or indirectly by suitable means; in either case an air temperature of between about 100°–300° C. is preferred. The evaporation rate is preferably maintained at a level to effect an exit air and product temperature range of between about 80°–150° C. Such operation yields a solid product which is between about 0 and 20 percent water content, porous, free flowing, and about 10 to 300 microns in particle size. Conventional spray-drying equipment is suitable for use in the process of the present invention. The term "spray drying" employed in this specification is intended to include any operation in which the phosphorylation liquor is dehydrated by contacting such liquor with gaseous material in a manner such that the gaseous material remains essentially the continuous phase. Other dehydration operations such as by submerged combustion techniques, for example, wherein the liquid phase is continuous, while not being preferred, are to be considered within the scope of the present invention when employed in conjunction with the novel sequence of operations disclosed herein.

A solid, free flowing mixture containing calcium sucrose phosphates, inorganic phosphate unreacted sucrose, and calcium chloride is withdrawn from spray-drying zone and passed in line 34 to leaching zone 38. In zone 38 calcium chloride and sucrose are extracted by contacting the mixture with a suitable solvent. In general any suitable solvent which will selectively leach calcium chloride and sugar from the aforementioned phosphates can be employed including, for example, methanol, butanol and mixtures thereof with ethanol. In the preferred embodiment of the process of this invention, ethanol is introduced via line 40 for leaching contact with the aforementioned mixture. Any suitable continuous or batch leaching operation employing an agitated vessel, or either the counter current or co-current contacting means known in the art can be employed in the practice of the present invention. Ethanol enriched in calcium chloride and sucrose is separated from the remaining phosphates containing solid material, preferably by filtration and withdrawn in line 42. Ethanol is preferably recovered for recycle essentially free of chloride and sucrose by evaporation of ethanol from solution and subsequent condensation thereof. Solid composition containing calcium sucrose phosphates and inorganic phosphate is withdrawn to drying zone 50, in line 46 where residual ethanol and moisture are removed, preferably under subatmospheric pressure. Dried product is withdrawn to storage in line 52.

A preferred product of the process of this invention has a chloride content less than about 0.5 percent and an organic phosphorus to inorganic phosphorus ratio between about 1.5 and about 3.4 and most preferably between about 2.0 and about 2.8.

Having, thus, described the invention in general terms reference is now made to specific examples of operation of the process of the present invention which should not be construed unduly limiting thereof.

EXAMPLE 1.—PHOSPHORYLATION

Eight batches of crude reaction mixture were prepared in a 5-gal. stainless steel reactor equipped with a high-speed agitator. For each of the batches prepared, the reactor was loaded with 29.40 lb. of deionized water, agitator speed was adjusted to 100 r.p.m., and over a 15-min. period, 8.82 lb. of hydrated lime (93.3% $Ca(OH)_2$) was added. To the lime slurry was added 20.20 lb. of sucrose solution (66.7% sucrose), again over a 15-min. period. During addition of the sucrose, the reactor temperature rose from about 18° C. to 24° C. Agitation was continued for an additional 15-min. to ensure complete mixing.

The lime-sugar slurry was then cooled to 10° C. by circulating chilled brine through the reactor jacket. Cooling was completed within 30 min.; constant agitation was maintained throughout the cooling cycle.

Phosphorus oxychloride (Stauffer Industrial Division, Morrisville, Pa.) was charged slowly to the reactor, maintaining close flow control. The addition tube terminated above the liquid surface in the reactor, thus permitting $POCl_3$ to be added onto the surface of the reaction mixture.

With the reactor contents maintained at 10° C.±1° C., the $POCl_3$ addition rate was controlled at about 7 cc./min. A total of 95% of the required $POCl_3$ was added over a 4-hr. period at this rate under conditions of vigorous agitation.

When 95% of the $POCl_3$ had been added, the addition rate was decreased to about 5 cc./min. The balance of $POCl_3$, required to bring the reaction mixture to within a pH of 7.5–8.0, was added at the reduced rate over a 30-min. period.

The total amount of $POCl_3$ charged to the reactor was 6.95 lb.

In two of the 8 runs, a slight back titration with 22.5% $Ca(OH)_2$ slurry was necessary to achieve the desired pH range.

EXAMPLE 2.—CLARIFICATION

Clarification of each of the crude reaction mixtures was performed with a high-speed centrifuge (solid bowl; 50,000 r.p.m.) to remove residual suspended solids. Clarification data are presented in Table 1, below.

EXAMPLE 3.—BLENDING

The clarified, aqueous reaction batches were blended together in a 55-gal. polyethylene tank equipped with a portable agitator. Table 2 summarizes the charge weight and analyses for the blend. The final blend is called the masterbatch.

TABLE 1.—CLARIFICATION

| Conditions | Run Number | | | | | | | |
|---|---|---|---|---|---|---|---|---|
| | 1 | 2 | 3 | 4 | 5 | 6 | 7 | 8 |
| Feed rate, cc./min | 200 | 200 | 200 | 200 | 200 | 200 | 200 | 200 |
| Total feed in, lb | 65.0 | 62.5 | 64.0 | 66.0 | 65.0 | 64.5 | 66.0 | 64.5 |
| Total feed out, lb | 63.5 | 62.1 | 63.3 | 63.3 | 62.2 | 63.7 | 65.2 | 64.1 |
| Solids retained, g | 94.5 | 97.5 | 125.0 | 130.0 | 180.0 | 98.0 | 110.0 | 85.0 |
| Liquid retained, g | 200.0 | 220.0 | 222.0 | 252.0 | 304.0 | 225.0 | 210.0 | 212.0 |
| Number of passes | 1 | 2 | 2 | 2 | 2 | 1 | 2 | 2 |
| pH, after clarification | 7.7 | 7.8 | 7.2 | 7.6 | 7.2 | 7.6 | 7.2 | 7.5 |

TABLE 2.—MASTERBATCH

| Blending | | Masterbatch | |
|---|---|---|---|
| | Amount, lb. | Analysis | Wt., percent |
| Run No.: | | | |
| 1 | 60.00 | pH | 7.55 |
| 2 | 58.90 | Cl | 7.40 |
| 3 | 60.80 | H$_2$O | 59.50 |
| 4 | 61.80 | Sugar (free) | 4.70 |
| 5 | 59.20 | P$_T$ | 2.15 |
| 6 | 61.60 | P$_I$ | 0.70 |
| 7 | 60.30 | Ca | 6.90 |
| 8 | 62.00 | | |
| Masterbatch | 484.60 | | |

EXAMPLES 4–5.—RECOVERY AND PURIFICATION

(4) Precipitation—Leach method

A portion of the masterbatch (70.0 lb.) was added to a 55-gal. polyethylene vessel equipped with an agitator and bottom discharge port. Over a 65-min. period, 116.0 lb. of absolute ethanol was added to the masterbatch under conditions of vigorous agitation to effect precipitation of the calcium sucrose phosphates.

After completing the addition of ethanol, the resultant precipitate was agitated for an additional 30 min. and subsequently vacuum filtered through a Nutsche. Filtration rates were very low, requiring approximately 8 hr. to complete a filtration cycle.

The filtered solids (46.5 lb., wet) were then leached with 170.0 lb. of 80% (by volume) ethanol in a 55-gal. polyethylene vessel. A first portion of the material treated as above was tray dried. A second portion was spray dried as shown in Table 3, below.

TABLE 3

Spray drying

Conditions:
Atomizer pressure—110 p.s.i.g.
Inlet gas temperature—174–182° C.
Outlet gas temperature—115–122° C.
Feed rate—11.65 lb./hr.
Total feed—93.25 lb.
Solids recovered—14.53 lb.

TABLE 4

Spray drying

Conditions:
Atomizer pressure—110 p.s.i.g.
Inlet gas temperature—185–191° C.
Outlet gas temperature—112–125° C.
Feed rate—10.4 lb./hr.
Total feed—43.6 lb.
Solids recovered—16.6 lb.

An 11.0 lb. portion of the spray-dried solids was leached seven times with 80% (by volume) ethanol. For leaching, the solids were charged into a 15-gal. open-topped polyethylene vessel, equipped with a bottom draw-off valve and portable agitator, and then treated with 22.0 lb. of 80% (by volume) ethanol. The slurry was agitated for one hour and then vacuum filtered. Filtration rates were observed to be very rapid. On completion of the sixty-leach stage, a sample of wet cake was dried at 70° C. under vacuum. The dried sample was found to contain 0.4% chloride. A seventh-leach stage was then performed to further reduce the chloride content.

The wet cake from the seventh-leach stage (10.00 lb.) was washed with absolute ethanol (8.14 lb.). The slurry was agitated with ethanol for 30 min. and then vacuum filtered.

Solids recovered (6.7 lb.) from the washing step were dried overnight under vacuum at 80° C. Recovered dry solids weighed 5.25 lb.

Leaching data for this sample are presented in Table 5, below.

TABLE 5.—LEACHING

| Conditions | Leaching stage No. | | | | | | | Washing stage |
|---|---|---|---|---|---|---|---|---|
| | 1 | 2 | 3 | 4 | 5 | 6 | 7 | |
| Spray dried solids charge, lb | 11.0 | | | | | | | |
| Absolute ethanol, lb | | | | | | | | 10.0 |
| Ethanol (80% by vol.), lb | 22.0 | 22.0 | 22.0 | 22.0 | 22.0 | 22.0 | 22.0 | |
| Wet solids charge, lb | | 14.55 | 12.87 | 9.78 | 9.22 | 11.05 | 8.14 | 8.14 |
| Wet solids recovered, lb | 14.55 | 12.87 | 9.78 | 9.22 | 11.05 | 8.14 | 8.14 | 6.70 |
| Mother liquor recovered, lb | 18.70 | 23.70 | 23.10 | 21.80 | 22.70 | 22.30 | 22.80 | 11.55 |
| Agitation time, hr | 1.0 | 1.0 | 1.0 | 1.0 | 1.0 | 1.0 | 1.0 | 0.5 |
| Temperature, ° C | 22 | 22 | 22 | 22 | 22 | 22 | 22 | 22 |

NOTE.—Drying data: Temperature, 80° C.; pressure, 0.9″ Hg; dry solids, 5.25 lb.

(5) Spray dry—Leach method

A 43.5 lb. charge of the masterbatch was spray dried prior to leaching under the conditions summarized in Table 4. Spray drying was performed in a Bower unit (Bower LAB model, 30-inch diam., direct fired, centrifugal disk atomizer) of about 10 lb./hr. evaporating capacity. Natural gas was employed for direct firing.

From the description hereinabove set forth it is apparent that the principal advantages of the present invention over the known process for removing calcium chloride from mixtures with calcium sucrose phosphates and inorganic phosphates include the ease of filtration and alcohol recovery, reduction in overall alcohol requirements, reduction in processing time, improvement in yield, and reduction in size of leaching equipment for a fixed product capacity. The major reduction in processing time as compared with the precipitation-washing process of the prior art is accounted for during filtration since the precipitated material is fine and flocculent material which is difficult to filter both from the standpoint of filtration rate and product recovery.

Having thus described the invention with reference to specific examples thereof, many modifications and alterations will become apparent to those skilled in the art without departing from the spirit or scope of the invention. For example, it is apparent that the process of the present invention is useful in the recovery of phosphate esters of other sugars including but not limited to phosphate esters of di and mono saccharides such as, for example, galactose, arabinose, ribose, xylose, maltose, lactose, raffinose and glucose.

TABLE 6.—ANALYSIS OF PRODUCTS

| | Products | | | |
|---|---|---|---|---|
| | Control | | Example | |
| Analysis | 1 | 2 | 5 | 4, Spray dried | 4, Tray dried |
| $P_T$, percent | 9.48 | 9.50 | 10.3 | 9.99 | 9.15 |
| $P_I$, percent | 3.05 | 3.21 | 3.20 | 3.23 | 3.05 |
| $P_I/P_T$ | 3.10 | 2.96 | 3.22 | 3.09 | 3.00 |
| Chloride, percent | 0.14 | 0.26 | 0.30 | 0.28 | 0.22 |
| Calcium, percent | 12.7 | 13.0 | 13.3 | 13.1 | 13.2 |
| Heavy metals, p.p.m. | <10 | <10 | <15 | <10 | <10 |
| As, Sb, p.p.m | 2 | 5 | 9 | 5 | 5 |
| $H_2O$, percent | 11.9 | 8.1 | 10.4 | 2.04 | 5.31 |
| pH | 9.5 | 8.6 | 7 | 8.3 | 8.6 |
| Turbidity, ETU | 264 | 188 | 96 | 114 | 188 |
| Color, ETU | 536 | 392 | 184 | 208 | 244 |
| Sugar (free), percent | 4.3 | 2.7 | 3.1 | 1.28 | 0.5 |

NOTE.—$P_T$ (total phosphorus), $P_I$ (inorganic phosphorus), chloride, calcium, heavy metals, As, Sb and fluoride are reported on a dry, sugar-free basis.

What is claimed is:

1. A process for recovering a composition containing calcium sugar phosphates and inorganic calcium phosphate which comprises: providing an aqueous liquor containing calcium sugar phosphates, inorganic calcium phosphate and calcium chloride, spray-drying said liquor and obtaining a solid, free flowing material containing said phosphates and calcium chloride, separating calcium chloride from said phosphates containing material by leaching with a suitable solvent and withdrawing said phosphates containing leached material.

2. The process of claim 1 in which said spray-drying step is effected by contacting said aqueous liquor with gaseous material.

3. The process of claim 2 in which said gaseous material is introduced in said spray-drying step at a temperature between about 100° and about 300° C. and conditions are maintained in said spray-drying step to produce a free flowing, particulate product containing between 0 and 20% water.

4. The process of claim 1 in which said solvent comprises ethanol.

5. The process of claim 4 in which said solvent comprises 80% (by volume) ethanol.

6. A process for recovering a product composition containing calcium sucrose phosphates, an inorganic phosphate, and less than about 0.5 percent chloride which comprises: providing an aqueous liquor containing a calcium sucrose phosphate, an inorganic calcium phosphate, calcium chloride, and unreacted sucrose, spray-drying such liquor to obtain a solid, free flowing composition containing said phosphates, chloride and sucrose, contacting said composition with a solvent comprising ethanol to reduce the chloride content thereof to less than about 0.5 percent and to remove sucrose, and drying the resulting phosphates containing composition.

References Cited

UNITED STATES PATENTS

| 3,356,482 | 12/1967 | Ogle et al. | 71—26X |
| 3,375,168 | 3/1968 | Curtin et al. | 424—57 |
| 3,437,652 | 4/1969 | Campbell | 260—234 |

JOHN T. GOOLKASIAN, Primary Examiner

M. E. McCAMISH, Assistant Examiner

U.S. Cl. X.R.

23—312; 34—10; 71—26; 260—234; 424—57

UNITED STATES PATENT OFFICE
CERTIFICATE OF CORRECTION

Patent No. 3,592,770     Dated July 13, 1971

Inventor(s) John Lambiris

It is certified that error appears in the above-identified patent and that said Letters Patent are hereby corrected as shown below:

Column 1, line 6, after the word "Refining", there should be inserted

---Company---

Signed and sealed this 7th day of December 1971.

(SEAL)
Attest:

EDWARD M. FLETCHER, JR.           ROBERT GOTTSCHALK
Attesting Officer                 Acting Commissioner of Patents